(12) United States Patent
Kogame

(10) Patent No.: US 10,900,574 B2
(45) Date of Patent: Jan. 26, 2021

(54) VALVE DEVICE

(71) Applicant: SHIMADZU CORPORATION, Kyoto (JP)

(72) Inventor: Masahito Kogame, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 197 days.

(21) Appl. No.: 15/863,932

(22) Filed: Jan. 7, 2018

(65) Prior Publication Data

US 2018/0202560 A1 Jul. 19, 2018

(30) Foreign Application Priority Data

Jan. 13, 2017 (JP) .................................. 2017-004328

(51) Int. Cl.
*F16K 3/06* (2006.01)
*F16K 27/04* (2006.01)
*F16K 3/30* (2006.01)
*F16K 51/02* (2006.01)

(52) U.S. Cl.
CPC .................. *F16K 3/06* (2013.01); *F16K 3/30* (2013.01); *F16K 27/045* (2013.01); *F16K 51/02* (2013.01)

(58) Field of Classification Search
CPC .......... F16K 3/04; F16K 27/045; F16K 51/02; F16K 3/30
See application file for complete search history.

(56) References Cited

U.S. PATENT DOCUMENTS

| 2,629,578 A | * | 2/1953 | Paul, Jr. ................... F16K 3/30 |
| | | | 251/124 |
| 5,577,707 A | | 11/1996 | Brida | |
| 7,140,847 B2 | * | 11/2006 | Boger ..................... F04B 37/14 |
| | | | 417/296 |

FOREIGN PATENT DOCUMENTS

| CN | 204403422 U | 6/2015 |
| JP | 2016031117 A | 3/2016 |
| WO | 2013073039 A | 5/2013 |

OTHER PUBLICATIONS

Chinese Office Action for corresponding App. No. 201711445446.5, dated Jan. 23, 2019.
Chinese Office Action for corresponding App. No. 201711445446.5, dated May 30, 2019 (with English translation).
Reasons for Refusal for corresponding Japanese Application No. No. 2017-004328, dated Feb. 26, 2020.

* cited by examiner

*Primary Examiner* — Reinaldo Sanchez-Medina
*Assistant Examiner* — Nicole Gardner
(74) *Attorney, Agent, or Firm* — Renner, Otto, Boisselle & Sklar, LLP

(57) ABSTRACT

A valve device comprises: a housing provided with a flow path; a valve body configured to move in a direction intersecting the flow path, thereby controlling an opening area of the flow path; a bonnet provided with a hollow portion and detachably attached to the housing, the hollow portion extending from the flow path in a radial direction and the valve body being retracted into the hollow portion; and a load receiving portion configured to receive inertia force generated at the bonnet by a rotation torque received by the housing due to external force.

3 Claims, 5 Drawing Sheets

VALVE DEVICE

TECHNICAL FIELD

The present invention relates to a valve device.

BACKGROUND ART

Typically in a case where a vacuum pump such as a turbo-molecular pump is attached to a vacuum chamber of a vacuum processing device, a vacuum valve is interposed. Patent Literature 1 (U.S. Pat. No. 5,577,707) discloses such a vacuum valve.

The vacuum valve described in Patent Literature 1 has a first housing provided with a gas flow path, a valve body, and a second housing configured to cover the valve body retracted from the flow path. The second housing is attached to a side surface of the first housing.

In the turbo-molecular pump, a rotor rotates at high speed at several tens of thousands of rpm. In a case where the rotor is damaged during rotation, great force (impact force) in a rotation direction is transmitted to a stationary side (e.g., a pump case) by rotor rotation energy. When such impact force is transmitted to the first housing of the vacuum valve through the pump case, great force acts such that the relative positions of the first and second housings are changed by force due to inertia of the second housing.

SUMMARY OF THE INVENTION

A valve device comprises: a housing provided with a flow path; a valve body configured to move in a direction intersecting the flow path, thereby controlling an opening area of the flow path; a bonnet provided with a hollow portion and detachably attached to the housing, the hollow portion extending from the flow path in a radial direction and the valve body being retracted into the hollow portion; and a load receiving portion configured to receive inertia force generated at the bonnet by a rotation torque received by the housing due to external force.

The load receiving portion is a fitting portion between the housing and the bonnet.

The fitting portion includes a recessed portion provided at one of the housing or the bonnet, and a protrusion provided at the other one of the housing or the bonnet and configured to fit in the recessed portion.

The housing has a first attachment surface to which the bonnet is attached, the bonnet has a second attachment surface attached to the housing to face the first attachment surface, the recessed portion is provided at one of the first or second attachment surface, and the protrusion is provided at the other one of the first or second attachment surface.

The recessed portion and the protrusion are longer in a direction perpendicular to an extension direction of the flow path and the radial direction than in the extension direction.

According to the present invention, even when inertia force is generated at a bonnet by a rotation torque received by a housing due to external force, such inertia force can be received by a load receiving portion. With this configuration, a change in the relative positions of the housing and the bonnet can be prevented, and therefore, failure of a valve device can be prevented.

DETAILED DESCRIPTION OF THE EXEMPLARY EMBODIMENTS

Figure 1:
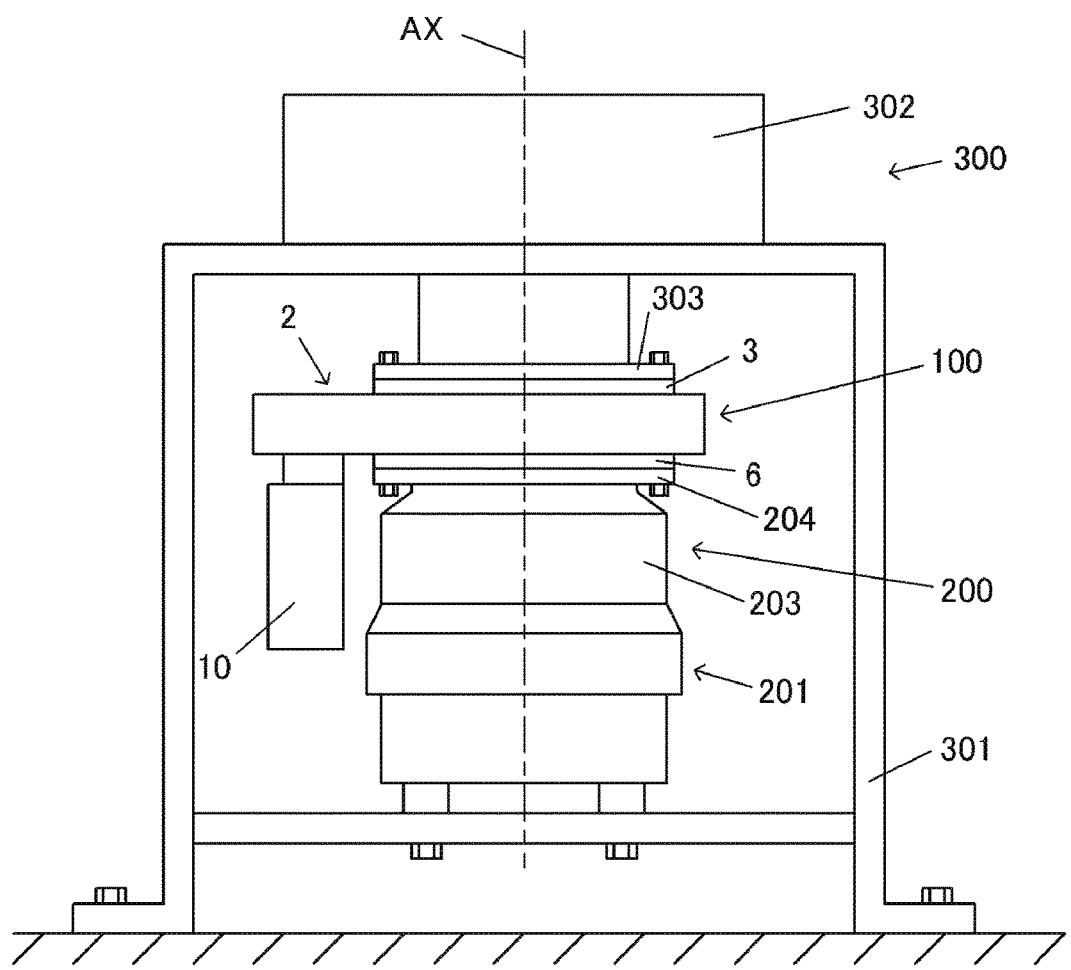
FIG. 1 is a view of a vacuum valve, a vacuum device, and a vacuum pump in an embodiment.

One embodiment of a vacuum valve as an example of a valve device will be described with reference to FIGS. 1 to 3A and 3B. FIG. 1 is a view of the vacuum valve, a vacuum device, and a vacuum pump in the present embodiment. The vacuum pump 200 is, e.g., a turbo-molecular pump, and is connected to the vacuum device 300 through the vacuum valve 100. A pump case 203 of the vacuum pump 200 is provided with a suction port flange 204. The suction port flange 204 is connected to a lower flange 6 of the vacuum valve 100 through bolts. A vacuum container 302 of the vacuum device 300 is provided with an exhaust flange 303. The exhaust flange 303 is connected to an upper flange 3 of the vacuum valve 100 through bolts. A pump main body 201 of the vacuum pump 200 is attached to a device frame 301 of the vacuum device 300. The vacuum pump 200, the vacuum valve 100, and the exhaust flange 303 are connected in series along a rotation axis AX of a not-shown rotor of the vacuum pump 200.

Figure 2:
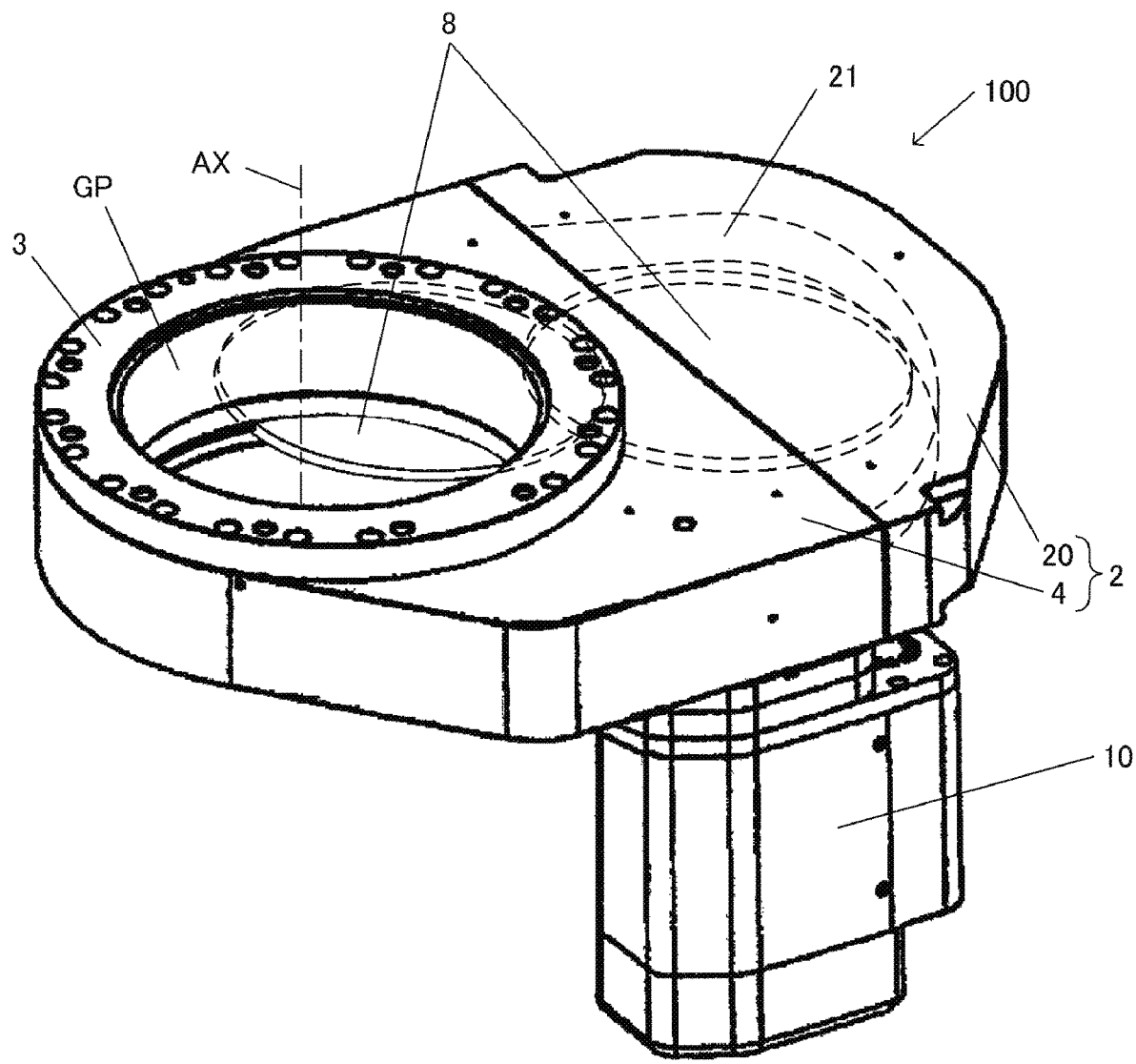
FIG. 2 is a perspective view of the vacuum valve.

FIG. 2 is a perspective view of the vacuum valve 100. The vacuum valve 100 includes a housing 2, a slide plate, i.e., a valve body 8, slidably driven in the housing 2, and a drive section 10 of the valve body 8. The housing 2 includes a housing base portion 4 and a bonnet 20 attached to the housing base portion 4 with bolts. The bonnet 20 is detachably provided at one end of the housing base portion 4. The above-described upper flange 3 is formed at an upper surface of the housing base portion 4. As illustrated in FIG. 1, the above-described lower flange 6 is formed at a lower surface of the housing base portion 4.

A gas flow path GP is formed at the housing base portion 4. The flow rate of gas passing through the gas flow path GP is adjusted in such a manner that the drive section 10 moves the valve body 8 to an optional angular position between a fully-closed angular position and a fully-opened angular position to control the opening area of the gas flow path GP.

The bonnet 20 has a valve body housing portion 21 configured to house the valve body 8 retracted from the gas flow path GP. The valve body housing portion 21 is a hollow portion extending from the gas flow path GP in a radial direction, the valve body 8 being retracted into the hollow portion.

Figure 3A:
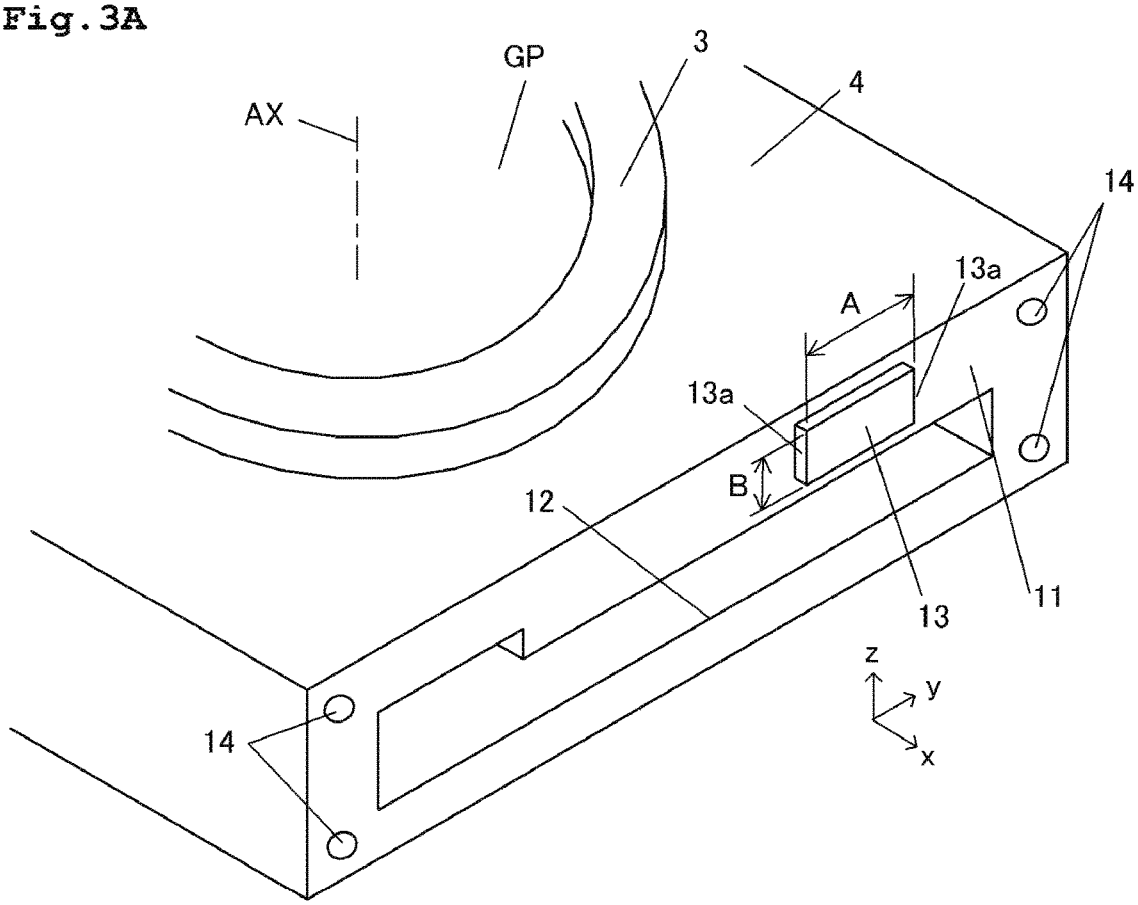
FIG. 3A is a schematic perspective view of a housing base portion from which a bonnet is detached.
Figure 3B:
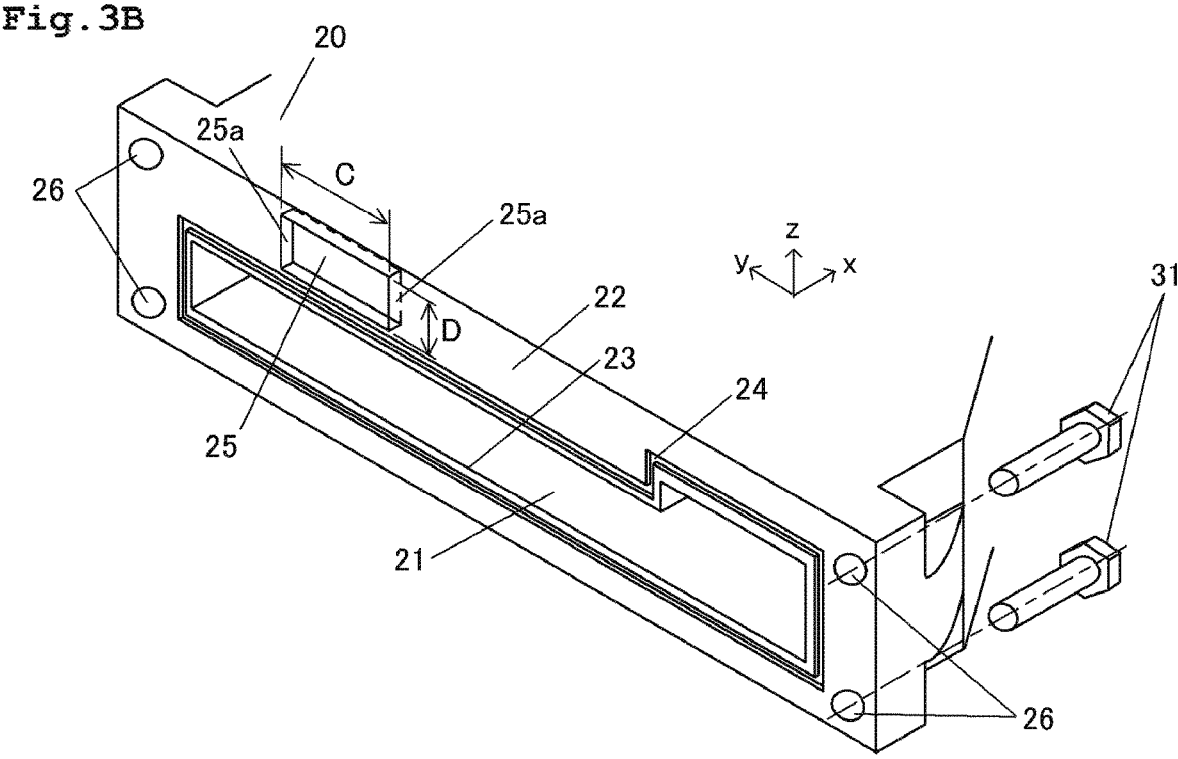
FIG. 3B is a schematic perspective view of the bonnet detached from the housing base portion.

The bonnet 20 is detachable from the housing 2 in such a manner that the bolts 31 (see FIGS. 3A and 3B) fastened to the housing base portion 4 are detached. FIG. 3A is a schematic perspective view of the housing base portion 4 from which the bonnet 20 is detached, and FIG. 3B is a schematic perspective view of the bonnet 20 detached from the housing base portion 4. As described above, the bonnet 20 is detachable so that the housing 2 can be divided. Thus, in a state in which the vacuum valve 100 is attached to the vacuum container 302 and the vacuum pump 200, the valve body 8 etc. can be replaced. Note that the valve body 8 etc. are not shown in FIG. 3A.

For the sake of convenience of description, a direction along the rotation axis AX of the not-shown rotor of the vacuum pump 200 is a z-direction, the radial direction from the rotation axis AX to the bonnet 20 is an x-direction, and a direction perpendicular to the z-direction and the x-direction is a y-direction, as illustrated in FIGS. 3A and 3B. Note that an extension direction of the gas flow path GP is coincident with an extension direction of the rotation axis AX of the rotor, i.e., the z-direction.

As illustrated in FIG. 3A, the housing base portion 4 has a base-portion-side attachment surface 11 to which the bonnet 20 is attached. The base-portion-side attachment surface 11 is parallel to a yz plane. The base-portion-side attachment surface 11 is provided with an opening 12, the moving valve body 8 passing through the opening 12. Moreover, the base-portion-side attachment surface 11 is provided with a load receiving protrusion 13, the load receiving protrusion 13 protruding outward of the opening 12 from the base-portion-side attachment surface 11 in the x-direction. The load receiving protrusion 13 will be described later in detail. The housing base portion 4 is provided with internal thread portions 14, the bolts 31 each being screwed into the internal thread portions 14.

As illustrated in FIG. 3B, the bonnet 20 has a bonnet-side attachment surface 22 which faces the base-portion-side attachment surface 11 of the housing base portion 4 and to which the housing base portion 4 is attached. The bonnet-side attachment surface 22 is parallel to the yz plane. The bonnet-side attachment surface 22 is provided with an opening 23 of the valve body housing portion 21. Moreover, the bonnet-side attachment surface 22 is provided with a seal groove 24 on the outside of the opening 23. A not-shown seal member is fitted in the seal groove 24. On the outside of the seal groove 24, the bonnet-side attachment surface 22 is provided with a load receiving recessed portion 25, the load receiving recessed portion 25 being recessed from the bonnet-side attachment surface 22 in the x-direction. The load receiving recessed portion 25 will be described later in detail. The bonnet 20 is provided with through-holes 26, the bolts 31 each being inserted into the through-holes 26.

The bonnet 20 is attached to the housing base portion 4 with the bolts 31 in a state in which the base-portion-side attachment surface 11 and the bonnet-side attachment surface 22 contact each other with the opening 12 of the base-portion-side attachment surface 11 and the opening 23 of the bonnet-side attachment surface 22 facing each other. Note that the not-shown seal member fitted in the seal groove 24 seals between the base-portion-side attachment surface 11 and the bonnet-side attachment surface 22. Moreover, when the bonnet 20 is attached to the housing base portion 4, the load receiving protrusion 13 of the housing base portion 4 is fitted in the load receiving recessed portion 25.

Load Receiving Protrusion 13 and Load Receiving Recessed Portion 25

The not-shown rotor of the vacuum pump 200 rotates at high speed at several tens of thousands of rpm in steady-state operation. Upon such high-speed rotation, in a case where the rotor and a stator contact each other due to a certain reason or a case where the rotor is damaged, impact force acts on the pump case 203 in a rotor rotation direction. Due to such impact force, a torque rotating the suction port flange 204 about the rotation axis AX is generated, and accordingly, the suction port flange 204 is rotatably moved. By such rotation movement, the vacuum valve 100 connected to the suction port flange 204 also rotatably moves in the same direction.

As described above, when the vacuum valve 100 receives, due to external force, the rotation torque about the extension direction of the gas flow path GP, inertia force is generated at the bonnet 20 provided on the outside of the gas flow path GP in the radial direction, i.e., the bonnet 20 at a position eccentric with respect to the rotation axis AX. Such inertia force acts as the force of shifting the housing base portion 4 and the bonnet 20 from each other along the base-portion-side attachment surface 11 and the bonnet-side attachment surface 22, i.e., along the y-direction illustrated in FIGS. 3A and 3B. Thus, in a typical vacuum valve, great shear force is applied to bolts fixing a bonnet to a housing base portion, leading to a probability that the bolts are broken.

Specifically in a case where the bonnet 20 is made of cast metal, tendency shows that a weight is greater than that in a case of the bonnet 20 is made by plate working. Moreover, tendency also shows that the above-described inertia force is greater.

For this reason, in the present embodiment, the inertia force generated at the bonnet 20 as described above is received by the load receiving protrusion 13 and the load receiving recessed portion 25. The load receiving protrusion 13 and the load receiving recessed portion 25 will be described below in detail.

As illustrated in FIG. 3A, the load receiving protrusion 13 is a protrusion in a rectangular parallelepiped shape, for example. As illustrated in FIG. 3B, the load receiving recessed portion 25 is a recessed portion provided to fit onto the load receiving protrusion 13 and formed in a rectangular parallelepiped shape, for example. When the bonnet 20 is attached to the housing base portion 4, side surfaces 13a of the load receiving protrusion 13 facing the y-direction each face side surfaces 25a of the load receiving recessed portion 25 facing the y-direction. A predetermined clearance is present between the side surface 13a of the load receiving protrusion 13 and the side surface 25a of the load receiving recessed portion 25, and therefore, the side surface 13a of the load receiving protrusion 13 and the side surface 25a of the load receiving recessed portion 25 are slightly apart from each other.

As described above, when the vacuum valve 100 receives, due to the external force, the rotation torque about the extension direction of the gas flow path GP, the housing base portion 4 and the bonnet 20 are shifted from each other along the y-direction by the above-described clearance due to the inertia force of the bonnet 20, and one of the side surfaces 13a of the load receiving protrusion 13 contacts a corresponding one of the side surfaces 25a of the load receiving recessed portion 25. When one of the side surfaces 13a of the load receiving protrusion 13 contacts a corresponding one of the side surfaces 25a of the load receiving recessed portion 25, the inertia force generated at the bonnet 20 is received by the load receiving protrusion 13 and the load receiving recessed portion 25. Thus, application of the shear force to the bolts 31 fixing the bonnet 20 to the housing base portion 4 can be prevented, and therefore, damage of the bolts 31 can be prevented.

As described above, the load receiving protrusion 13 and the load receiving recessed portion 25 as a fitting portion between the housing base portion 4 and the bonnet 20 form a load receiving portion configured to receive the inertia force generated at the bonnet 20. Note that the load receiving portion can be also called a "load bearing portion."

Note that the clearance present between the side surface 13a of the load receiving protrusion 13 and the side surface 25a of the load receiving recessed portion 25 is smaller than a clearance between the bolt 31 fixing the bonnet 20 to the housing base portion 4 and the through-hole 26 of the bonnet 20 into which the bolt 31 is inserted. Thus, even when the housing base portion 4 and the bonnet 20 are shifted from each other along the y-direction by the above-described clearance due to the inertia force of the bonnet 20, contact between the through-hole 26 of the bonnet 20 and the bolt 31 can be prevented, and therefore, damage of the bolts 31 can be prevented.

For shortening a distance between the vacuum pump 200 and the vacuum device 300, an interplanar distance between the upper flange 3 and the lower flange 6 of the vacuum valve 100 is preferably shortened. For this reason, the dimension of the vacuum valve 100 in the z-direction is preferably small. Thus, the base-portion-side attachment surface 11 and the bonnet-side attachment surface 22 are shorter in the z-direction than in the y-direction. The shear force along the y-direction acts on the load receiving protrusion 13 due to the inertia force generated at the bonnet 20. Thus, equal to or larger than a certain area of the load receiving protrusion 13 along the yz plane, i.e., a certain product of a length A and a length B illustrated in FIG. 3A, needs to be ensured for ensuring sufficient strength of the load receiving protrusion 13 against the shear force. The length A is the length of the load receiving protrusion 13 along the y-direction, and the length B is the length of the load receiving protrusion 13 along the z-direction.

Thus, in the present embodiment, the length A in the y-direction, which has an extra length as compared to that in the z-direction, is increased as compared to the length B so that the area of the load receiving protrusion 13 along the yz plane is ensured for ensuring the strength of the load receiving protrusion 13. Note that the load receiving recessed portion 25 is formed in accordance with the shape of the load receiving protrusion 13. Thus, as illustrated in FIG. 3B, the length C of the load receiving recessed portion 25 along the y-direction is longer than a length D along the z-direction.

In the vacuum valve 100 of the above-described embodiment, the following features and advantageous effects are provided.

(1) The vacuum valve 100 includes: the housing base portion 4 provided with the gas flow path GP; the valve body 8 configured to move in the direction intersecting the gas flow path GP, thereby controlling the opening area of the gas flow path GP; the bonnet 20 provided with the valve body housing portion 21 and detachably attached to the housing base portion 4, the valve body housing portion 21 extending from the gas flow path GP in the radial direction and the valve body 8 being retracted into the valve body housing portion 21; and the load receiving protrusion 13 and the load receiving recessed portion 25 configured to receive the inertia force generated at the bonnet 20 by the rotation torque received by the housing base portion 4 due to the external force.

With this configuration, even when the vacuum valve 100 receives, due to the external force, the rotation torque about the extension direction of the gas flow path GP and the inertia force is generated at the bonnet 20, such inertia force can be received by the load receiving protrusion 13 and the load receiving recessed portion 25. Thus, application of the shear force to the bolts 31 fixing the bonnet 20 to the housing base portion 4 can be prevented, and therefore, damage of the bolts 31 can be prevented.

(2) The vacuum valve 100 has the load receiving recessed portion 25 provided at the bonnet 20, and the load receiving protrusion 13 provided at the housing base portion 4 and configured to fit in the load receiving recessed portion 25. With this configuration, even when the vacuum valve 100 receives, due to the external force, the rotation torque about the extension direction of the gas flow path GP and the inertia force is generated at the bonnet 20, such inertia force can be received by the fitting portion between the load receiving protrusion 13 and the load receiving recessed portion 25. Thus, application of the shear force to the bolts 31 fixing the bonnet 20 to the housing base portion 4 can be prevented, and therefore, damage of the bolts 31 can be prevented.

(3) The housing base portion 4 has the base-portion-side attachment surface 11 to which the bonnet 20 is attached, and the bonnet 20 has the bonnet-side attachment surface 22 attached to the housing base portion 4 to face the base-portion-side attachment surface 11. The load receiving recessed portion 25 is provided at the bonnet-side attachment surface 22, and the load receiving protrusion 13 is provided at the base-portion-side attachment surface 11. With this configuration, when the bonnet 20 is attached to the housing base portion 4, the opening 12 of the base-portion-side attachment surface 11 and the opening 23 of the bonnet-side attachment surface 22 face each other, and the load receiving protrusion 13 of the housing base portion 4 is fitted in the load receiving recessed portion 25. In this manner, the bonnet 20 is easily attached to the housing base portion 4, and therefore, maintainability of the vacuum valve 100 can be improved.

(4) Of the load receiving recessed portion 25 and the load receiving protrusion 13, the lengths C, A in the direction perpendicular to the extension direction of the gas flow path GP and the radial direction of the gas flow path GP are longer than the lengths D, B in the extension direction of the gas flow path GP. With this configuration, the strength of the load receiving protrusion 13 can be ensured in the vacuum valve 100 with the limited interplanar distance between the upper flange 3 and the lower flange 6.

Second Embodiment

A second embodiment of a vacuum valve as an example of a valve device will be described with reference to FIG. 4. In description below, the same reference numerals as those of the first embodiment are used to represent equivalent elements, and differences will be mainly described. Points which will not be described specifically are the same as those of the first embodiment.

Figure 4:
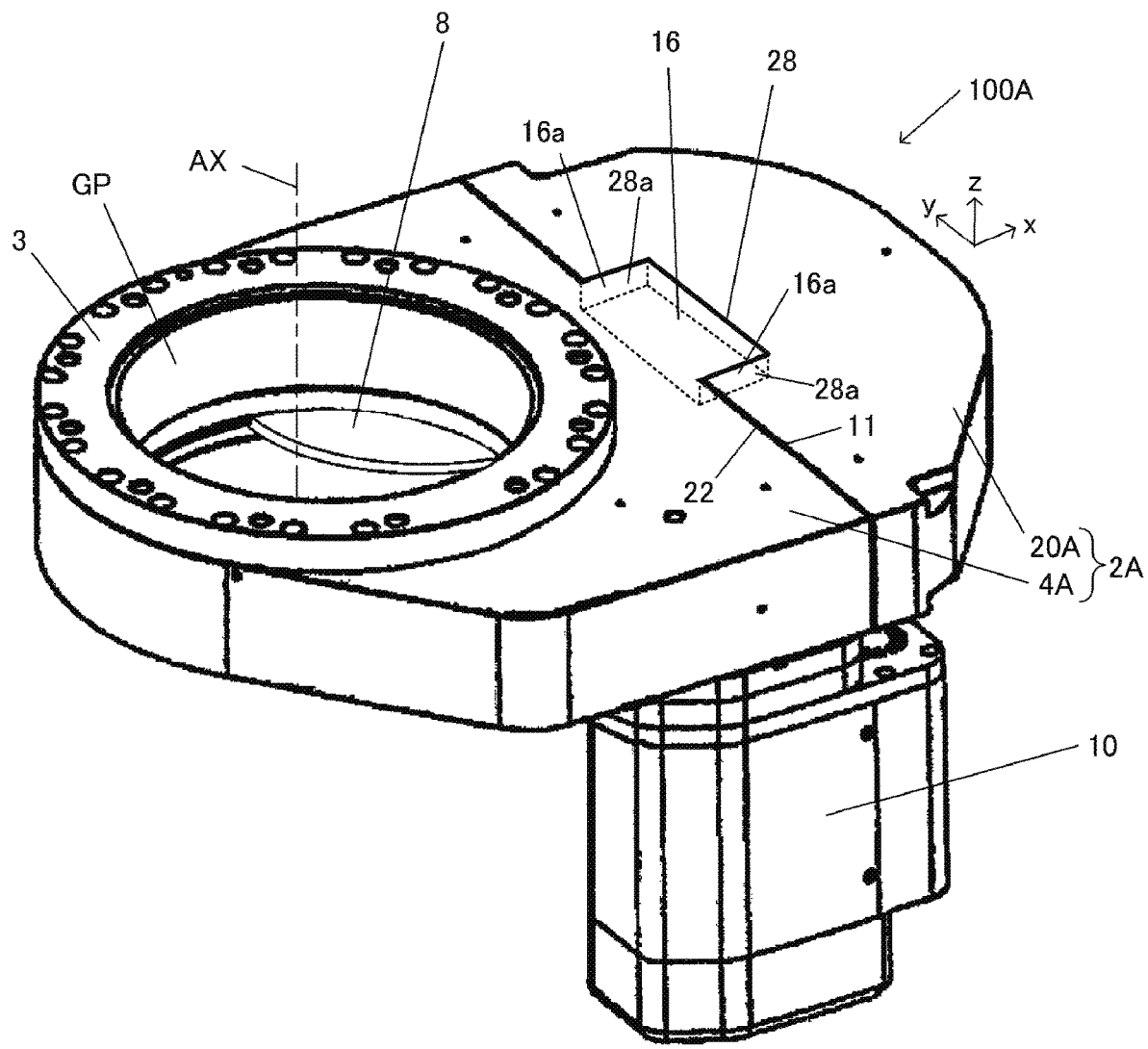
FIG. 4 is a perspective view of a vacuum valve of a second embodiment.

FIG. 4 is a perspective view of a vacuum valve 100A of the second embodiment. A housing 2A of the vacuum valve 100A includes a housing base portion 4A and a bonnet 20A attached to the housing base portion 4A with bolts 31 (see FIGS. 3A and 3B). On the upper side of the housing base portion 4A as viewed in the figure, a protrusion 16 protrudes from a base-portion-side attachment surface 11 in the x-direction is formed. The protrusion 16 is in a thick plate shape with a predetermined thickness in the z-direction, and for example, is in a rectangular shape as viewed in the z-direction. Note that the housing base portion 4A of the present embodiment is not provided with a load receiving protrusion 13 as described in the first embodiment.

On the upper side of the bonnet 20A as viewed in the figure, a recessed portion 28 recessed from a bonnet-side attachment surface 22 in the x-direction is formed. The recessed portion 28 is in a groove shape with a predetermined depth in the z-direction, and for example, is in a rectangular shape as viewed in the z-direction. Note that the bonnet 20A of the present embodiment is not provided with a load receiving recessed portion 25 as described in the first embodiment.

When the bonnet 20A is attached to the housing base portion 4A, the protrusion 16 of the housing base portion 4A is fitted in the recessed portion 28, and one of side surfaces 16a of the protrusion 16 facing the y-direction faces a corresponding one of side surfaces 28a of the recessed portion 28 facing the y-direction. A predetermined clearance is present between the side surface 16a of the protrusion 16 and the side surface 28a of the recessed portion 28. Thus, the side surface 16a of the protrusion 16 and the side surface 28a of the recessed portion 28 are slightly apart from each other.

When the vacuum valve 100A receives, due to external force, a rotation torque about an extension direction of a gas flow path GP, the housing base portion 4A and the bonnet 20A are shifted from each other along the y-direction by the above-described clearance due to inertia force of the bonnet 20A, and one of the side surfaces 16a of the protrusion 16 contacts a corresponding one of the side surfaces 28a of the recessed portion 28. When one of the side surfaces 16a of the protrusion 16 contacts a corresponding one of the side surfaces 28a of the recessed portion 28, the inertia force generated at the bonnet 20A is received by the protrusion 16 and the recessed portion 28. Thus, application of shear force to the bolts 31 fixing the bonnet 20A to the housing base portion 4A can be prevented, and therefore, damage of the bolts 31 can be prevented.

Third Embodiment

A third embodiment of a vacuum valve as an example of a valve device will be described with reference to FIG. 5. In description below, the same reference numerals as those of the first and second embodiments are used to represent equivalent elements, and differences will be mainly described. Points which will not be described specifically are the same as those of the first and second embodiments. The present embodiment is mainly different from the first and second embodiments in that inertia force generated at a bonnet is received by a thick plate-shaped member attached to each side surface of a housing base portion and the bonnet.

Figure 5:
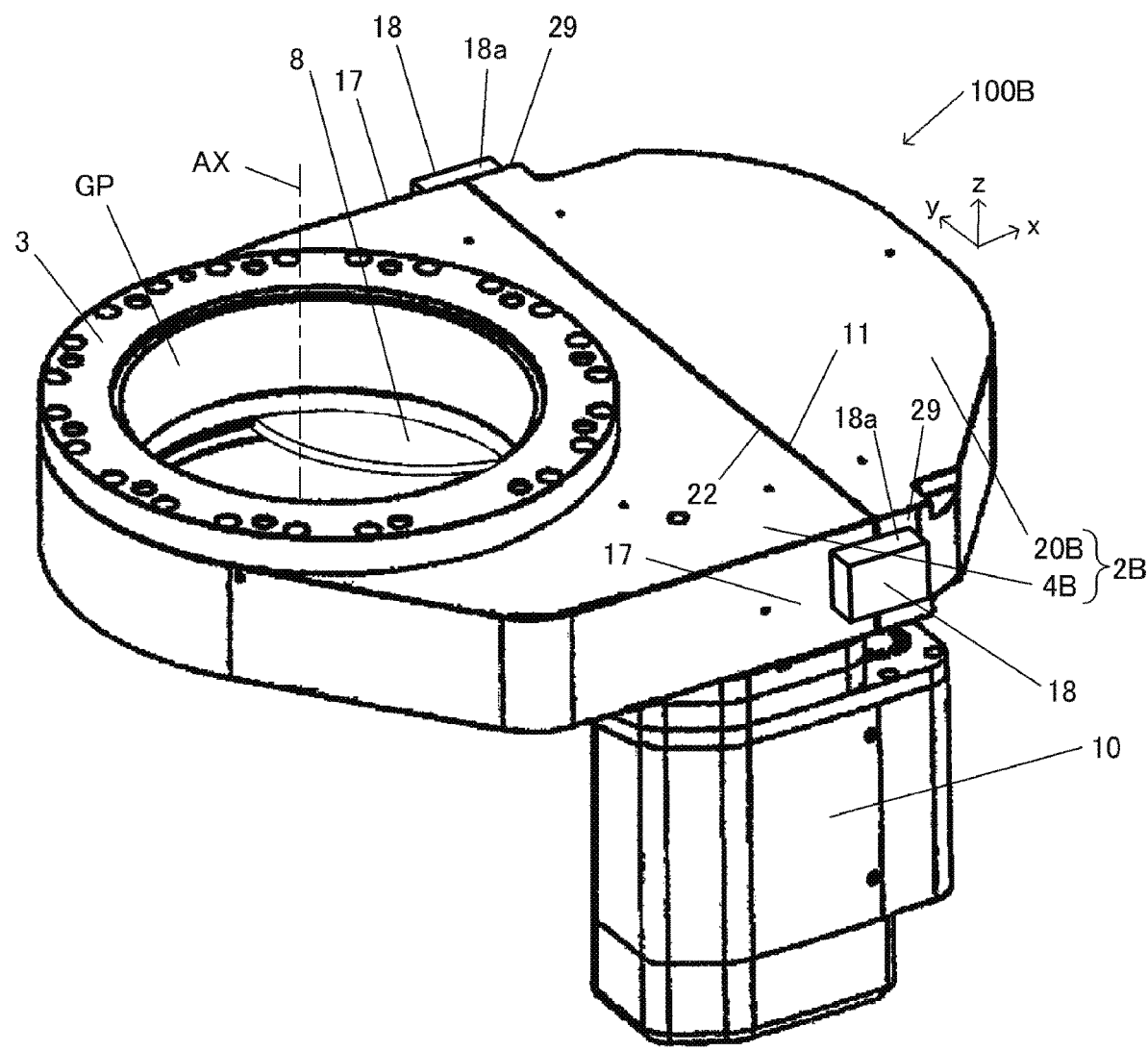
FIG. 5 is a perspective view of a vacuum valve of a third embodiment.

FIG. 5 is a perspective view of a vacuum valve 100B of the third embodiment. A housing 2B of the vacuum valve 100B includes a housing base portion 4B and a bonnet 20B attached to the housing base portion 4B with bolts 31 (see FIGS. 3A and 3B). Load receiving members 18 are each attached to two side surfaces 17 of the housing base portion 4B facing the y-direction. The load receiving members 18 are, for example, members in a thick rectangular plate shape, and are each fixed to the side surfaces 17 by welding. Tip end portions 18a of the load receiving members 18 each protrude from a base-portion-side attachment surface 11 in the x-direction.

Note that the housing base portion 4B of the present embodiment is not provided with a load receiving protrusion 13 as described in the first embodiment and a protrusion 16 as described in the second embodiment. Moreover, the bonnet 20B of the present embodiment is not provided with a load receiving recessed portion 25 as described in the first embodiment and a recessed portion 28 as described in the second embodiment.

When the bonnet 20B is attached to the housing base portion 4B, two side surfaces 29 of the bonnet 20B facing the y-direction become flush with the side surfaces 17 of the housing base portion 4B. Inner surfaces of the tip end portions 18a of the load receiving members 18 each face the side surfaces 17 of the housing base portion 4B in the y-direction. A clearance corresponding to a predetermined tolerance is present between the inner surface of the tip end portion 18a of the load receiving member 18 and the side surface 17 of the housing base portion 4B. That is, the inner surface of the tip end portion 18a of the load receiving member 18 and the side surface 17 of the housing base portion 4B are slightly apart from each other.

When the vacuum valve 100B receives, due to external force, a rotation torque about an extension direction of a gas flow path GP, the housing base portion 4B and the bonnet 20B are shifted from each other along the y-direction by the above-described clearance due to inertia force of the bonnet 20B, and one of the tip end portions 18a of the load receiving members 18 contacts a corresponding one of the side surfaces 29 of the bonnet 20B. When one of the tip end portions 18a of the load receiving members 18 contacts a corresponding one of the side surfaces 29 of the bonnet 20B, the inertia force generated at the bonnet 20B is received by one of the load receiving members 18. Thus, application of shear force to the bolts 31 fixing the bonnet 20B to the housing base portion 4B can be prevented, and therefore, damage of the bolts 31 can be prevented.

Note that the above-described first to third embodiments may be combined as necessary.

The following variations are within the scope of the present invention, and one or more of the variations may be combined with the above-described embodiments.

(First Variation) In the above-described first embodiment, the load receiving protrusion 13 as a protrusion is provided on the base-portion-side attachment surface 11 of the housing base portion 4, and the load receiving recessed portion 25 as a recessed portion is provided at the bonnet-side attachment surface 22 of the bonnet 20. However, a protrusion corresponding to the load receiving protrusion 13 may be provided on the bonnet-side attachment surface 22 of the bonnet 20, and a recessed portion to be fitted onto the protrusion may be provided at the base-portion-side attachment surface 11 of the housing base portion 4. As described above, a vacuum valve configured such that a recessed-raised relationship of the fitting portion between the housing base portion 4 and the bonnet 20 is inverted from that of the first embodiment as described above provides features and advantageous effects similar to those of the first embodiment.

Moreover, in the above-described second embodiment, the protrusion 16 as a protrusion is provided at the housing base portion 4A, and the recessed portion 28 as a recessed portion is provided at the bonnet 20A. However, a protrusion corresponding to the protrusion 16 may be provided at the bonnet 20A, and a recessed portion to be fitted onto the protrusion may be provided at the housing base portion 4B. As described above, a vacuum valve configured such that a recessed-raised relationship of the fitting portion between the housing base portion 4A and the bonnet 20A is inverted from that of the second embodiment as described above provides features and advantageous effects similar to those of the second embodiment.

(Second Variation) In the above-described third embodiment, the load receiving members 18 are each fixed to the side surfaces 17 of the housing base portion 4B. However, the load receiving members 18 are not necessarily fixed to the housing base portion 4B, and may be each fixed to the side surfaces 29 of the bonnet 20B. A vacuum valve configured such that the load receiving members 18 are each fixed to the side surfaces 29 of the bonnet 20B provides features and advantageous effects similar to those of the third embodiment.

Moreover, in the above-described third embodiment, the load receiving members 18 are each fixed to the side surfaces 17 of the housing base portion 4B. However, the load receiving member 18 may be fixed to either one of the side surfaces 17 of the housing base portion 4B. In this case, when the rotation direction of the not-shown rotor of the vacuum pump 200 is, for example, the clockwise direction as viewed in FIG. 5, the load receiving member 18 may be attached to an upper one of the side surfaces 17 of the housing base portion 4B as viewed in the figure.

Alternatively, instead of the load receiving member 18 attached to the upper one of the side surfaces 17 as viewed in the figure as described above or in addition to the load receiving member 18 attached to the upper one of the side surfaces 17 as viewed in the figure, the load receiving member 18 may be fixed to a lower one of the side surfaces 29 of the bonnet 20B as viewed in the figure.

(Third Variation) The load receiving protrusion 13 and the load receiving recessed portion 25 in the above-described first embodiment, the protrusion 16 and the recessed portion 28 in the above-described second embodiment, and the load receiving members 18 in the above-described third embodiment are each in the rectangular shape as viewed in each of the x-direction, the y-direction, and the z-direction. However, these shapes are not limited to the rectangular shape as long as the above-described inertia force can be received.

(Fourth Variation) In the above-described first embodiment, the load receiving protrusion 13 as a protrusion is provided at the housing base portion 4, and the load receiving recessed portion 25 as a recessed portion is provided at the bonnet 20. However, a recessed portion similar to the load receiving recessed portion 25 may be, at the housing base portion 4, also provided at a position facing the load receiving recessed portion 25, and a key to be fitted in such a recessed portion and the load receiving recessed portion 25 may be provided. With this configuration, the inertia force generated at the bonnet 20 can be received by the recessed portion provided at the housing base portion 4, the key, and the load receiving recessed portion 25.

(Fifth Variation) In the above-described first embodiment, the pair of the load receiving protrusion 13 and the load receiving recessed portion 25 is provided. However, two or more pairs of the load receiving protrusion 13 and the load receiving recessed portion 25 may be provided.

Moreover, in the above-described second embodiment, the pair of the protrusion 16 and the recessed portion 28 is provided on the upper side of the housing base portion 4A as viewed in FIG. 4. However, the pair of the protrusion 16 and the recessed portion 28 may be provided on the lower side of the housing base portion 4A as viewed in FIG. 4, or may be provided on each of the upper and lower sides of the housing base portion 4A as viewed in FIG. 4. Alternatively, two or more pairs of the protrusion 16 and the recessed portion 28 may be provided on the upper or lower side of the housing base portion 4A as viewed in FIG. 4.

(Sixth Variation) In the above-described first embodiment, the load receiving recessed portion 25 is provided on the outside of the annular seal groove 24. However, the load receiving recessed portion 25 may be provided on the inside of the annular seal groove 24.

(Seventh Variation) In description above, the vacuum pump 200 is, e.g., the turbo-molecular pump. However, the vacuum pump 200 may be other forms of rotary vacuum pumps such as a molecular drag pump.

The various embodiments and the variations have been described above, but the present invention is not limited to these contents. Other aspects conceivable within the scope of the technical idea of the present invention are also included in the scope of the present invention.

What is claimed is:

1. A vacuum system, comprising:
a vacuum pump including a rotor and a stator; and
a valve device, the valve device comprising:
   a housing provided with a flow path and including a flange that is directly contacted with the vacuum pump;
   a valve body configured to move in a direction intersecting the flow path, the valve body configured to move in and out of the flow path thereby controlling an opening area of the flow path;
   a bonnet provided with a hollow portion and detachably attached to the housing by at least one bolt extending through a corresponding through-hole in the bonnet or housing, the hollow portion extending from the flow path in a radial direction and the valve body being retracted in the radial direction from the flow path into the hollow portion through an opening in the bonnet; and
   a load receiving portion configured to receive inertia force generated at the bonnet by a rotation torque received by the housing due to rotation torque in a case where the rotor and the stator contact each other or the rotor is damaged in the vacuum pump,
   wherein the load receiving portion includes a recessed portion provided at one of the housing or the bonnet, and a protrusion provided at the other one of the housing or the bonnet and configured to fit in the recessed portion;
   the recessed portion and the protrusion are positioned about only a portion of a circumference of the opening of the bonnet; and
   a clearance between the recessed portion and the protrusion is smaller than a clearance between the at least one bolt and the corresponding through-hole.

2. The vacuum system according to claim 1, wherein
the housing has a first attachment surface to which the bonnet is attached,
the bonnet has a second attachment surface attached to the housing to face the first attachment surface,
the recessed portion is provided at one of the first or second attachment surface, and
the protrusion is provided at the other one of the first or second attachment surface.

3. The vacuum system according to claim 2, wherein
the recessed portion and the protrusion are longer in a direction perpendicular to an extension direction of the flow path and the radial direction than in the extension direction.

* * * * *